(12) United States Patent
Liang et al.

(10) Patent No.: US 12,534,816 B2
(45) Date of Patent: Jan. 27, 2026

(54) PREPARATION DEVICE FOR MAGNESIUM OXIDE FIBER AND PREPARATION METHOD THEREOF

(71) Applicant: TANGSHAN WEIMEI NEW MATERIAL TECHNOLOGY CO., LTD., Hebei (CN)

(72) Inventors: Liang Liang, Hebei (CN); Yitong Wang, Hebei (CN); Yijun Wang, Hebei (CN); Mingming Dong, Hebei (CN); Gaoliang Zhao, Hebei (CN)

(73) Assignee: TANGSHAN WEIMEI NEW MATERIAL TECHNOLOGY CO., LTD., Hebei (CN)

( * ) Notice: Subject to any disclaimer, the term of this patent is extended or adjusted under 35 U.S.C. 154(b) by 776 days.

(21) Appl. No.: 17/912,987

(22) PCT Filed: Jul. 18, 2022

(86) PCT No.: PCT/CN2022/106194
§ 371 (c)(1),
(2) Date: Sep. 20, 2022

(87) PCT Pub. No.: WO2023/168879
PCT Pub. Date: Sep. 14, 2023

(65) Prior Publication Data
US 2024/0218533 A1      Jul. 4, 2024

(30) Foreign Application Priority Data

Mar. 11, 2022    (CN) .......................... 202210235066.3

(51) Int. Cl.
*C25B 9/30*       (2021.01)
*C25B 1/20*       (2006.01)
(Continued)

(52) U.S. Cl.
CPC ................ *C25B 9/30* (2021.01); *C25B 1/20* (2013.01); *D06M 10/06* (2013.01); *D06M 11/34* (2013.01);
(Continued)

(58) Field of Classification Search
CPC .... C25B 9/30; C25B 1/20; C25B 9/01; C25B 11/042; D06M 10/06; D06M 11/34;
(Continued)

(56) References Cited

U.S. PATENT DOCUMENTS 3,314,759 A * 4/1967 Kawai ............... C04B 35/62263
                                                    423/641
4,010,233 A * 3/1977 Winter ................... C08J 5/0405
                                                    501/102
(Continued)

FOREIGN PATENT DOCUMENTS

CN       113445097 A *  9/2021  ............... C25D 9/08
JP      2015043281 A *  3/2015

OTHER PUBLICATIONS

Machine Translation of JP-2015043281-A.*
Machine Translation of CN-113445097-A.*

*Primary Examiner* — Bryan D. Ripa
(74) *Attorney, Agent, or Firm* — Nields, Lemack & Frame, LLC

(57) ABSTRACT

The present disclosure discloses a preparation device for magnesium oxide fiber and preparation method thereof. The preparation device for the magnesium oxide fiber includes a fiber releasing device, an electrochemical reaction device, a heating device, and a fiber receiving device. The fiber releasing device is used for releasing magnesium metal fiber. The electrochemical reaction device is used for oxidizing the magnesium metal fiber released by the fiber releasing device into magnesium hydroxide fiber, comprising a solution storage part, a negative electrode, and a positive electrode.

(Continued)

Neutral electrolyte is stored in the solution storage part to soak the magnesium metal fiber released by the fiber releasing device. The heating device is used for heating the magnesium hydroxide fiber prepared by the electrochemical reaction device, to obtain magnesium oxide fiber. The fiber receiving device is used for receiving the magnesium oxide fiber obtained after being heated.

15 Claims, 3 Drawing Sheets

(51) Int. Cl.
   *D06M 10/06* (2006.01)
   *D06M 11/34* (2006.01)
   *D06M 101/00* (2006.01)

(52) U.S. Cl.
   CPC .... *D06M 2101/00* (2013.01); *D06M 2200/30* (2013.01)

(58) Field of Classification Search
   CPC ......... D06M 2101/00; D06M 2200/30; D06M 10/00; D06M 11/44; C04B 2235/401; C04B 35/62263; C01F 5/08; D01D 10/00; D01D 10/02; D01D 11/00; D01F 9/08; D01F 11/00; D02G 3/12; D10B 2101/02; D10B 2101/20
   See application file for complete search history.

(56) References Cited

U.S. PATENT DOCUMENTS 4,104,395 A * 8/1978 Frankel ............. C04B 35/62263
                                                    264/DIG. 19
4,533,508 A * 8/1985 Stevens ............. C04B 35/62263
                                                    264/234

* cited by examiner

PREPARATION DEVICE FOR MAGNESIUM OXIDE FIBER AND PREPARATION METHOD THEREOF

TECHNICAL FIELD

The present disclosure relates to the technical field of preparation of magnesium oxide, and in particular relates to a preparation device for magnesium oxide fiber and preparation method thereof.

BACKGROUND ART

Flame-retardant fibers are fibers which are only in smoldering in flames and do not generate flames themselves, and smoldering of which is automatically extinguished after leaving the flames. Flame-retardant fabrics prepared from the flame-retardant fibers are widely used in many fields such as clothing and furniture and so on. As the magnesium oxide has good fire resistance and insulating properties, it is generally prepared into nano-magnesium oxide in powder state, and is used as an additive to prepare the flame-retardant fiber together with other materials. However, the manufacturing process of such flame-retardant fiber is relatively complex and high in production cost.

SUMMARY

An objective of the present disclosure is to provide a preparation device for magnesium oxide fiber and a preparation method thereof, in which magnesium oxide fiber can be directly prepared from magnesium metal fiber to prepare a flame-retardant fabric as flame-retardant fiber.

To achieve the objective, the present disclosure provides the following solutions.

In accordance with the present disclosure, a preparation method for magnesium oxide fiber is provided, comprising:
 a fiber releasing device for releasing magnesium metal fiber;
 an electrochemical reaction device for oxidizing the magnesium metal fiber released by the fiber releasing device into magnesium hydroxide fiber, comprising a solution storage part, a negative electrode and a positive electrode, wherein metal fiber is stored in the solution storage part to soak the magnesium metal fiber released by the fiber releasing device: a first end of the negative electrode is configured for being electrically connected to the magnesium metal fiber, a first end of the positive electrode is used for being electrically connected to the neutral electrolyte, and a second end of the negative electrode and a second end of the positive electrode are configured for outputting electric energy;
 a heating device for heating the magnesium hydroxide fiber prepared by the electrochemical reaction device to obtain magnesium oxide fiber: and
 a fiber receiving device for receiving the magnesium oxide fiber obtained after the heating of the heating device.

Preferably, the solution storage part is a water absorption part.

Preferably, the electrochemical reaction device further includes a solution adding device for adding the neutral electrolyte in the water absorption part.

Preferably, the solution adding device is an electrolyte bath for accommodating the neutral electrolyte, and the water absorption part is configured for being partially immersed into the neutral electrolyte in the electrolyte bath.

Preferably, the electrochemical reaction device further includes a first roller assembly and a second roller assembly, and the first roller assembly and the second roller assembly are respectively located at two sides of the magnesium metal fiber: the first roller assembly and the second roller assembly each include a roller and a roller driving device: the roller driving device is connected to the roller to drive the roller to rotate around its own axis: the water absorption part is annular and encloses the roller, thus the water absorption part can keep in contact with the magnesium metal fiber when the roller rotates: a portion of the roller in contact with the water absorption part is provided with a catalyst layer, and the catalyst layer is used for catalyzing the process of oxidizing the magnesium metal fiber into the magnesium hydroxide fiber: the electrolyte bath is mounted at the lower end of the roller: the positive electrode is mounted on the roller driving device, the first end of the positive electrode is slidably electrically connected to the roller to be electrically connected to the neutral electrolyte through the roller and the catalyst layer.

Preferably, the water absorption part on the first roller assembly and the water absorption part on the second roller assembly clamp the magnesium metal fiber from two sides respectively.

Preferably, the preparation device further includes a first position adjusting device, wherein the first position adjusting device is simultaneously connected to the roller driving device of the first roller assembly and the roller driving device of the second roller assembly, in order to enable clamping or loosening the magnesium metal fiber by the water absorption part on the first roller assembly and the water absorption part on the second roller assembly.

Preferably, the first position adjusting device includes a first support, a first linear motor and a second linear motor: the roller driving device of the first roller assembly is mounted on the first linear motor, and the roller driving device of the second roller assembly is mounted on the second linear motor: and the first linear motor and the second linear motor are both mounted on the first support slidably along a straight line.

Preferably, the first support is further provided with a first strip-shaped groove, a retractable first wire is arranged in the first strip-shaped groove, the second end of the positive electrode is slidably mounted in the first strip-shaped groove, and the second end of the positive electrode is electrically connected to the first wire.

Preferably, the fiber releasing device includes an unwinding spool driving device and an unwinding spool, the unwinding spool is configured for winding the magnesium metal fiber, and the unwinding spool driving device is connected to the unwinding spool to drive the unwinding spool to rotate around its own axis: the negative electrode is mounted on the unwinding spool driving device, and the first end of the negative electrode is slidably electrically connected to the unwinding spool to be electrically connected to the magnesium metal fiber through the unwinding spool.

Preferably, the fiber storage device further includes a winding spool driving device and a winding spool, the winding spool is configured for winding the magnesium oxide fiber, and the winding spool driving device is connected to the winding spool to drive the winding spool to rotate around its own axis.

Preferably, the preparation device further comprising a second position adjusting device, wherein the second position adjusting device is simultaneously connected to the unwinding spool driving device and the winding spool driving device to adjust a spacing distance between the unwinding spool and the winding spool.

Preferably, the second position adjusting device includes a second support, a third linear motor and a fourth linear motor: the unwinding spool driving device is mounted on the third linear motor, and the winding spool driving device is mounted on the fourth linear motor; and the third linear motor and the fourth linear motor are both mounted on the second support slidably along a straight line.

Preferably, the second support is provided with a second strip-shaped groove, a retractable second wire is arranged in the second strip-shaped groove, the second end of the negative electrode is slidably mounted in the second strip-shaped groove, and the second end of the negative electrode is electrically connected to the second wire.

A preparation method of magnesium oxide fiber is further disclosed by the present disclosure, comprising the following steps:

releasing magnesium metal fiber by a fiber releasing device;

guiding released magnesium metal fiber to pass through the electrochemical reaction device to conduct a galvanic cell reaction, wherein the magnesium metal fiber is configured as an anode and forms magnesium hydroxide fiber in the galvanic cell reaction;

converting the magnesium hydroxide fiber into magnesium oxide fiber after the magnesium hydroxide fiber being heated by the heating device: and receiving the magnesium oxide fiber by a fiber receiving device.

Compared with the prior art, the present disclosure has the following technical effects:

The fibrous magnesium oxide prepared by the present disclosure can be directly used as the flame-retardant fiber to facilitate later mechanical spinning of a high-temperature-resistant functional fabric, and there is no need to synthesize the magnesium oxide and other materials, thus the process is simple, the cost is low, and the processing efficiency is high. Moreover, the electrochemical reaction device can output electric energy during working, thus playing a role of energy conservation and environmental protection.

BRIEF DESCRIPTION OF THE DRAWINGS

To describe the technical solutions in the embodiments of the present disclosure or in the prior art more clearly, the accompanying drawings required for describing the embodiments will be introduced briefly below. Apparently, the accompanying drawings in the following description show merely some embodiments of the present disclosure, and those skilled in the art may still derive other drawings from these accompanying drawings without creative efforts.

Figure 1:
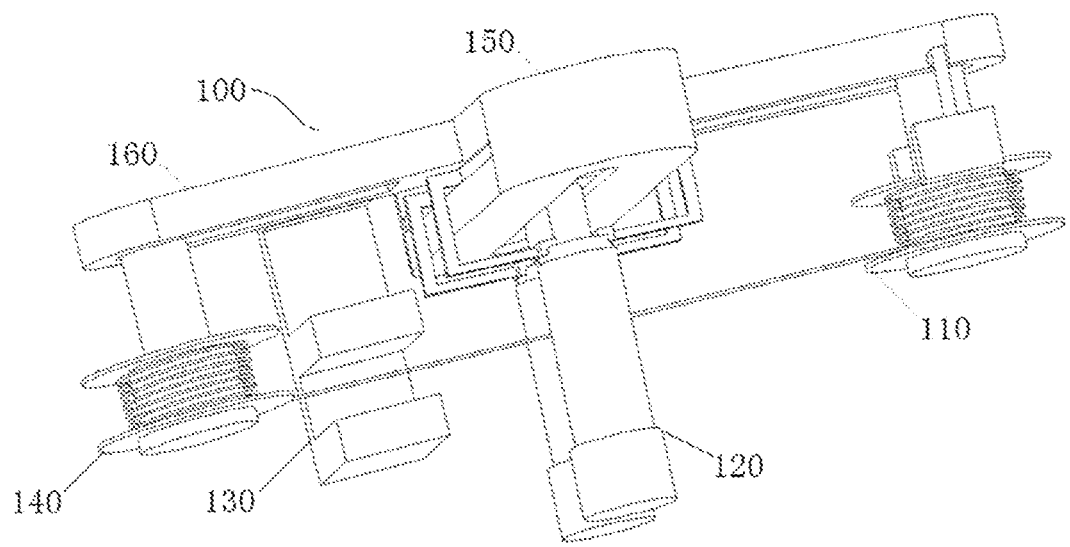
FIG. 1 is an axonometric view of a preparation device for magnesium oxide fiber in accordance with an embodiment of the present disclosure.

In the drawings:
100, preparation device for magnesium oxide fiber; 110, fiber releasing device; 111, unwinding spool driving device; 1111, first base; 112, unwinding spool; 120, electrochemical reaction device; 121, solution storage part; 122, negative electrode; 123, positive electrode; 124, solution adding device; 125, roller; 126, roller driving device; 130, heating device; 140, fiber receiving device; 141, winding spool driving device; 142, winding spool; 150, first position adjusting device; 151, first support; 1511, first strip-shaped groove; 160, second position adjusting device; 161, first mounting block; 162, second mounting block.

DETAILED DESCRIPTION OF THE EMBODIMENTS

The technical solutions in the embodiments of the present disclosure are described clearly and completely below with reference to the accompanying drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

An objective of the present disclosure is to provide a preparation device for magnesium oxide fiber and a preparation method for magnesium oxide fiber. In accordance with the preparation device and the preparation method, magnesium oxide fiber can be directly prepared from magnesium metal fiber to prepare a flame-retardant fabric as flame-retardant fiber.

To make the objective, features and advantages of the present disclosure understood clearly and easily, the present disclosure is further described in detail below with reference to the accompanying drawings and embodiments.

Referring to FIG. 1 to FIG. 5, a preparation device 100 for magnesium oxide fiber is provided in accordance with an embodiment, comprising a fiber releasing device 110, an electrochemical reaction device 120, a heating device 130, and a fiber receiving device 140.

The fiber releasing device 110 is used for releasing magnesium metal fiber. The electrochemical reaction device 120 is used for oxidizing the magnesium metal fiber released by the fiber releasing device 110 into magnesium hydroxide fiber, and the electrochemical reaction device 120 includes a solution storage part 121, a negative electrode 122, and a positive electrode 123. Neutral electrolyte is stored in the solution storage part 121 to soak the magnesium metal fiber released by the fiber releasing device 110. A first end of the negative electrode 122 is used for being electrically connected to the magnesium metal fiber, a first end of the positive electrode 123 is used for being electrically connected to the neutral electrolyte, and both a second end of the negative electrode 122 and a second end of the positive electrode 123 are used for outputting electric energy. The heating device 130 is used for heating the magnesium hydroxide fiber prepared by the electrochemical reaction device 120 in order to obtain magnesium oxide fiber. The fiber receiving device 140 is used for receiving the magnesium oxide fiber obtained after the heating of the heating device 130. The heating device 130 may be an electric resistance wire, or other device capable of generating heat. The heating temperature may be at 360° ° C. or other suitable temperature as long as magnesium hydroxide can be heated to obtain magnesium oxide.

In operation of the preparation device 100 for the magnesium oxide fiber in accordance with the present embodiment, at first the release device 110 releases the magnesium metal fiber, then the magnesium metal fiber is subjected to a galvanic cell reaction at the electrochemical reaction device 120 to be oxidized into the magnesium hydroxide fiber, then the magnesium hydroxide fiber is heated at the heating device 130 to obtain the magnesium oxide fiber, and finally the magnesium oxide fiber is received by the fiber receiving device 140. The prepared fibrous magnesium oxide can be directly used as flame-retardant fiber to facilitate later mechanized weaving of a high-temperature-resistant functional fabric, and there is no need to synthesize the magnesium oxide with other materials, thus the process is simple, with the low cost and the high processing efficiency. In addition, the electrochemical reaction device 120 can output electric energy during work, and the output electric energy can be supplied to the preparation device 100 for the magnesium oxide fiber for self-use, so as to play a role of energy saving and environmental protection. Certainly, the electric energy output by the electrochemical reaction device can also be stored in an electric energy storage device such as a battery, or can be directly supplied to other electric appliances for use.

Figure 2:
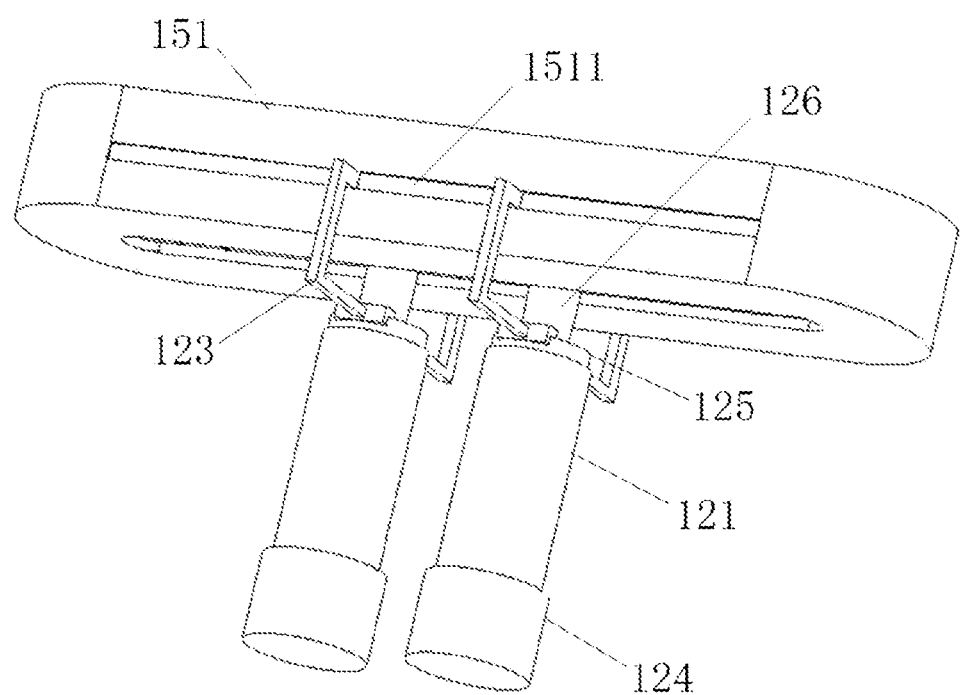
FIG. 2 is a schematic diagram showing a positional relationship among a first roller assembly, a second roller assembly, and a first position adjusting device.
Figure 3:
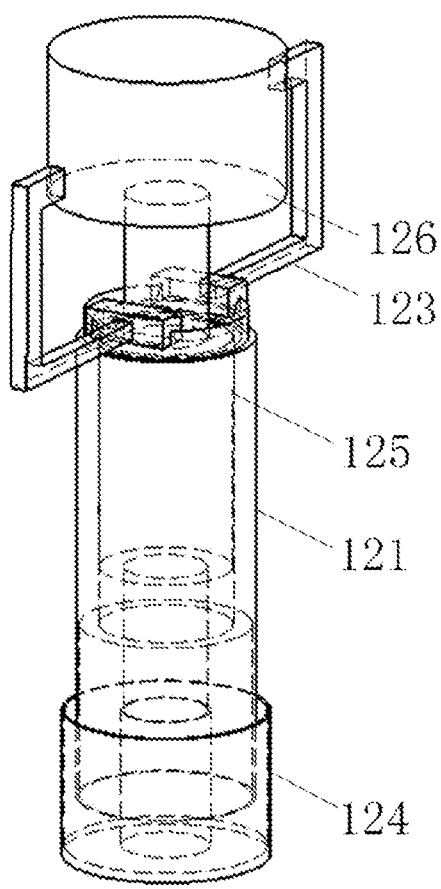
FIG. 3 is a schematic diagram of partial structure of an electrochemical reaction device.

Referring to FIG. 2 to FIG. 3, there are various types of solution storage parts 121 as long as the neutral electrolyte can be stored therein to soak the magnesium metal fiber. In the present embodiment, the solution storage part 121 is preferably a water absorption part, and is further preferably sponge or a water absorption fabric. The sponge or water absorption fabric has good water storage capacity, can store more neutral electrolyte and is easy to deform, thus enabling the neutral electrolyte to enclose the magnesium metal fiber better and making the reaction more sufficiently. According to different actual needs, those skilled in the art can also select silica gel, resin and other water absorption parts with weaker water storage and deformation capacities. In the present embodiment, the neutral electrolyte is preferably a sodium chloride solution with a mass concentration of 10%. According to different actual needs, those skilled in the art can also select other types of neutral electrolytes, such as the electrolyte prepared from sodium citrate and citric acid in a molar ratio of 1:1, or a potassium chloride solution, a magnesium chloride solution, and the like.

Referring to FIG. 1 to FIG. 3, in order to continuously supplement the neutral electrolyte to the solution storage part, in this embodiment, the electrochemical reaction device 120 further includes a solution adding device 124 for adding the neutral electrolyte to the water absorption part.

Referring to FIG. 3, in this embodiment, the solution adding device 124 is an electrolyte bath for accommodating the neutral electrolyte, and the water absorption part is used for being partially immersed into the neutral electrolyte in the electrolyte bath. According to different actual needs, those skilled in the art can also select a spraying device or a dripping device to supplement the neutral electrolyte to the water absorption part in a spraying or a dripping mode.

Referring to FIG. 1 to FIG. 3, in this embodiment, the electrochemical reaction device 120 further includes a first roller assembly and a second roller assembly, the first roller assembly and the second roller assembly are respectively located at two sides of the magnesium metal fiber. The roller assembly and the second roller assembly each includes a roller 125 and a roller driving device 126, the roller driving device 126 is connected to the roller 125 to drive the roller 125 to rotate around an axis of the roller 125. The water absorption part is annular, and encloses the roller 125, so that the water absorption part can keep in contact with the magnesium metal fiber when the roller 125 rotates. A portion of the roller 125 in contact with the water absorption part is provided with a catalyst layer, and the catalyst layer is used for catalyzing the process of oxidizing the magnesium metal fiber into the magnesium hydroxide fiber. The electrolyte bath is mounted at the lower end of the roller 125. The positive electrode 123 is mounted on the roller driving device 126, the first end of the positive electrode 123 is slidably electrically connected to the roller 125 so as to be electrically connected to the neutral electrolyte through the roller 125. During use, a distance between the roller 125 and the magnesium metal fiber can be set to be less than a thickness of the water absorption part, thus making the water absorption part be extruded to deform to increase the contact area of the water absorption part with the magnesium metal fiber. When the roller 125 rotates, the water absorption part rotates along with the roller 125, and the neutral electrolyte at different positions in a circumferential direction of the water absorption part can all be extruded out of the water absorption part to soak the magnesium metal fiber. When a certain position in the circumferential direction of the water absorption part is extruded, other positions are restored to original shapes and absorb the neutral electrolyte in the electrolyte bath, in order to ensure that the storage of the neutral electrolyte at each position in the circumferential direction of the water absorption part is sufficient and to ensure the continuous and stable operation of the electrochemical reaction process. In this embodiment, the catalyst layer is preferably a composite catalyst of graphene and carbon micro-spheres. According to different actual needs, those skilled in the art can also select other types of catalysts, such as a Pt-based catalyst. Besides providing the neutral electrolyte, the electrolyte bath can also receive the neutral electrolyte flowing out of the water absorption part when the water absorption part is extruded to deform, thus avoiding the waste of the neutral electrolyte.

Referring to FIG. 1, in this embodiment, the water absorption part on the first roller assembly and the water absorption part on the second roller assembly clamp the magnesium metal fiber from two sides respectively, when the pressures applied to the magnesium metal fiber by the water absorption part on the first roller assembly and the water absorption part on the second roller assembly counteracts each other, the magnesium metal fiber cannot be bent and deformed. According to different actual needs, those skilled in the art can also make the water absorption part on the first roller assembly and the water absorption part on the second roller assembly stagger with each other in an extending direction of the magnesium metal fiber, thus making the magnesium metal fiber be distributed in an S shape under the action of the pressures of the water absorption parts.

Referring to FIG. 1 to FIG. 2, the preparation device 100 for the magnesium oxide fiber in accordance with this embodiment further includes a first position adjusting device 150, the first position adjusting device 150 is simultaneously connected to the roller driving device 126 of the first roller assembly and the roller driving device 126 of the second roller assembly, in order to enable clamping and loosening the magnesium metal fiber by the water absorption part on the first roller assembly and the water absorption part on the second roller assembly.

Referring to FIG. 1 to FIG. 2, in this embodiment, the first position adjusting device 150 includes a first support 151, a first linear motor, and a second linear motor. The roller driving device 126 of the first roller assembly is mounted on the first linear motor, and the roller driving device 126 of the second roller assembly is mounted on the second linear motor. The first linear motor and the second linear motor are both mounted on the first support 151 slidably along a straight line. The first linear motor slides on the first support 151 along a straight line during working, so as to adjust a spacing distance between the first roller assembly and the magnesium metal fiber. The second linear motor slides on the first support 151 along a straight line during working, so as to adjusting a spacing distance between the second roller assembly and the magnesium metal fiber. Prior to the beginning of the electrochemical reaction, a certain distance should be kept between the water absorption part on the first roller assembly and the water absorption part on the second roller assembly, in order that the magnesium metal fiber can be placed the both water absorption parts: and then the first linear motor and the second linear motor are started to make the water absorption part on the first roller assembly and the water absorption part on the second roller assembly clamp the magnesium metal fiber tightly. According to different actual needs, those skilled in the art can also select other types of first position adjusting devices 150, for example, replacing the first linear motor with a first air cylinder, and replacing the second linear motor with a second air cylinder.

As the positive electrode 123 is mounted on the roller driving device 126, when the first position adjusting device 150 moves the roller driving device 126, the positive electrode 123 is moved accordingly. Referring to FIG. 1 to FIG. 2, in this embodiment, the first support 151 is provided with a first strip-shaped groove 1511, and a retractable first wire is arranged in the first strip-shaped groove 1511, such as a helical first wire. The second end of the positive electrode 123 is slidably mounted in the first strip-shaped groove 1511, and the second end of the positive electrode 123 is electrically connected to the first wire. The first wire is used as an intermediate structure between the positive electrode 123 and the electric appliance, thus a situation that the positive electrode 123 cannot keep stable electric connection to the electric appliance due to movement thereof can be avoided. The first wire is placed in the first strip-shaped groove 1511 and is retractable, thus the first wire can be prevented from being wound and knotted.

Figure 4:
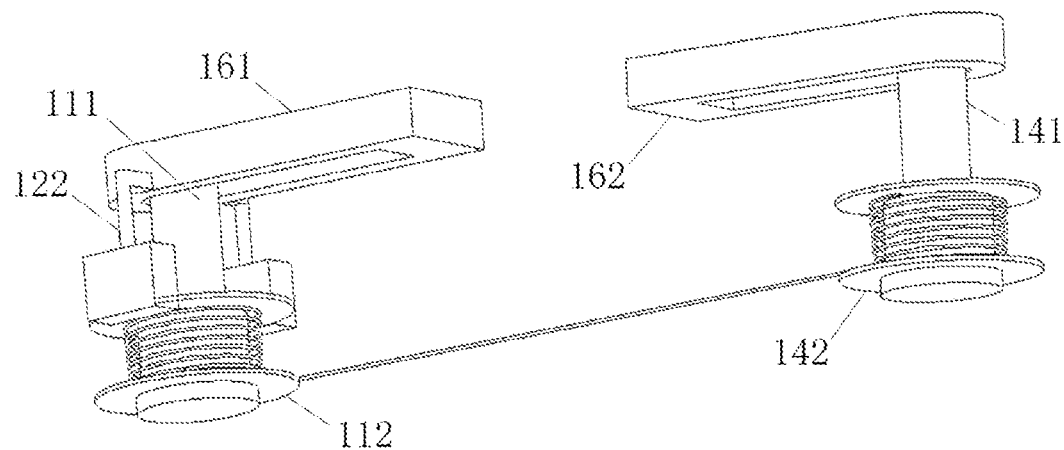
FIG. 4 is a schematic diagram showing a positional relationship among a fiber releasing device, a fiber storage device, and a second position adjusting device.
Figure 5:
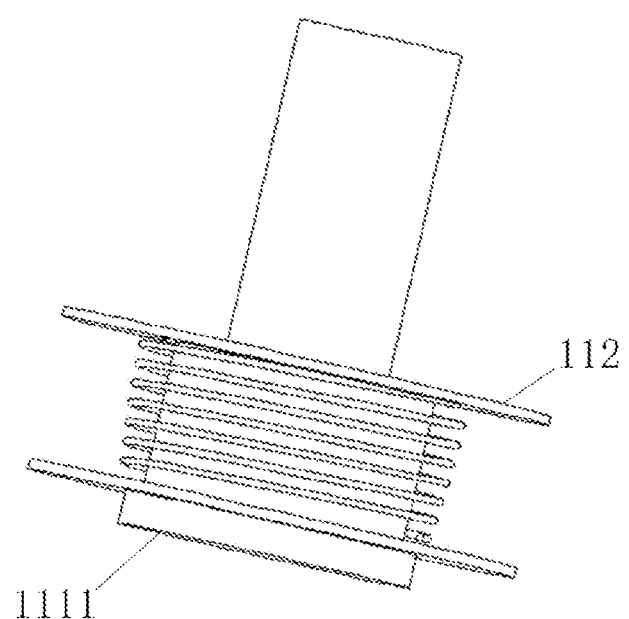
FIG. 5 is a schematic diagram showing a positional relationship between an unwinding spool and an adjacent transmission shaft as well as a first base.

Referring to FIG. 1, FIG. 4 to FIG. 5, in this embodiment, the fiber releasing device 110 includes an unwinding spool driving device 111 and an unwinding spool 112. The unwinding spool 112 is used for winding the magnesium metal fiber, and the unwinding spool driving device 111 is connected to the unwinding spool 112 to drive the unwinding spool 112 to rotate around an axis of the unwinding spool 112. The negative electrode 122 is mounted on the unwinding spool driving device 111, the first end of the negative electrode 122 is slidably electrically connected to the unwinding spool 112 to be electrically connected to the magnesium metal fiber through the unwinding spool 112. In this embodiment, the first end of the negative electrode 122 and the first end of the positive electrode 123 are both in sliding electric connection, thus conducting current between relatively rotating components.

Referring to FIG. 1 and FIG. 4, in this embodiment, the fiber receiving device 140 includes a winding spool driving device 141 and a winding spool 142. The winding spool 142 is used for winding the magnesium oxide fiber, the winding spool driving device 141 is connected to the winding spool 142 to drive the winding spool 142 to rotate around an axis of the winding spool 142.

It can be understood that those skilled in the art can also employ other types of fiber releasing device 110 and fiber receiving device 140 as long as the releasing of the magnesium metal fiber and the receiving of the magnesium oxide fiber can be achieved. For example, the fiber releasing device 110 may include a cylinder, a limiting ring, and a fabric layer, wherein the cylinder is used for placing annularly wound magnesium metal fiber therein, and a winding center of the magnesium metal fiber is the axis of the cylinder: the limiting ring is used for allowing the magnesium metal fiber to pass through: and the fabric layer is mounted on the limiting ring to reduce the friction between the magnesium metal fiber and the limiting ring. As another example, the fiber receiving device 140 may include a square groove and an air cylinder, wherein a piston rod of the air cylinder is connected to the square groove for driving the square groove to reciprocate along a straight line, thus oscillating and collecting the magnesium oxide fiber in the square groove.

Referring to FIG. 1 and FIG. 4, the preparation device 100 for the magnesium oxide fiber in accordance with this embodiment further includes a second position adjusting device 160, and the second position adjusting device 160 is simultaneously connected to the unwinding spool driving device 111 and the winding spool driving device 141 to adjust a spacing distance between the unwinding spool 112 and the winding spool 142, thus adjusting the degree of tension of the magnesium metal fiber.

Referring to FIG. 1 and FIG. 4, in this embodiment, the second position adjusting device 160 includes a second support, a third linear motor, and a fourth linear motor. The unwinding spool driving device 111 is mounted on the third linear motor, and the winding spool driving device 141 is mounted on the fourth linear motor. The third linear motor and the fourth linear motor are both mounted on the second support slidably along a straight line. According to different actual needs, those skilled in the art can also select other types of second position adjusting devices 160, for example, replacing the third linear motor with a third air cylinder, and replacing the fourth linear motor with a fourth air cylinder.

As the negative electrode 122 is mounted on the unwinding spool driving device 111, when the second position adjusting device 160 moves the unwinding spool driving device 111, the negative electrode 122 is moved accordingly. In this embodiment, the second support is provided with a second strip-shaped groove, a retractable second wire is arranged in the second strip-shaped groove, such as a helical second wire. The second end of the negative electrode 122 is slidably mounted in the second strip-shaped groove, and the second end of the negative electrode 122 is electrically connected to the second wire. The second wire is used as an intermediate structure between the negative electrode 122 and the electric appliance, thus a situation that the negative electrode 122 cannot keep stable electric connection to the electric appliance due to movement thereof can be avoided. The second wire is placed in the second strip-shaped groove and is retractable, thus the second wire can be prevented from being wound and knotted.

Referring to FIG. 1 to FIG. 2, and FIG. 4, in this embodiment, the second support includes a first support 151, a first mounting block 161, and a second mounting block 162. The first mounting block 161 and the second mounting block 162 are detachably mounted at two sides of the first support 151. The third linear motor is mounted on the first mounting block 161 slidably along a straight line, the second strip-shaped groove is located on the first mounting block 161, and the fourth linear motor is mounted on the second mounting block 162 slidably along a straight line.

Referring to FIG. 1 to FIG. 5, in this embodiment, the roller driving device 126, the unwinding spool driving device 111 and the winding spool driving device 141 each include a gear motor, a motor cover, and a transmission shaft: the gear motor is mounted in the motor cover, and an output shaft of the gear motor is connected to the transmission shaft to output power outwards by the transmission shaft. For the roller driving device 126 of the first roller assembly, the motor cover thereof is mounted on the first linear motor. For the roller driving device 126 of the second roller assembly, the motor cover thereof is mounted on the second linear motor. For the unwinding spool driving device 111, the motor cover thereof is mounted on the third linear motor. For the winding spool driving device 141, the motor cover thereof is mounted on the fourth linear motor.

Referring to FIG. 1, FIG. 4 to FIG. 5, in this embodiment, the unwinding spool driving device 111 further includes a first base 1111, the first base 1111 is detachably mounted on the transmission shaft of the unwinding spool driving device 111 to limit the unwinding spool 112 in an axial direction, thus preventing the unwinding spooling from falling off. The unwinding spool 112 is sleeved outside the transmission shaft of the unwinding spool driving device 111 and is threaded to the transmission shaft, and both ends of the unwinding spool 112 are provided with limiting plates to prevent the magnesium metal fiber from falling off.

Referring to FIG. 1 and FIG. 4, in this embodiment, the winding spool driving device 141 further includes a second base, the second base is detachably mounted on the transmission shaft of the winding spool driving device 141 to limit the winding spool 142 in an axial direction, thus preventing the winding spool from falling off. The winding pool 142 is sleeved outside the transmission shaft of the winding spool driving device 141 and is threaded to the transmission shaft, and both ends of the winding spool 142 are provided with limiting plates to prevent the magnesium oxide fiber from falling off.

It needs to be noted that, in order to improve the preparation efficiency of the magnesium oxide fiber, the transmission shaft of the unwinding spool driving device 111 can be sleeved with a plurality of unwinding spools 112, the transmission shaft of the winding spool driving device 141 can be sleeved with the same number of winding spools 142 as the unwinding spools 112, in order to achieve the simultaneous unwinding and winding of multiple magnesium metal fibers.

In the embodiment, a reaction formula that the magnesium metal fiber is oxidized into the magnesium hydroxide fiber is as follows:

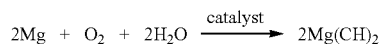

$$2Mg + O_2 + 2H_2O \xrightarrow{\text{catalyst}} 2Mg(CH)_2$$

In the embodiment, a reaction formula that the magnesium hydroxide fiber is heated to obtain the magnesium oxide fiber is as follows:

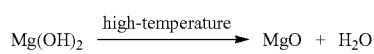

$$Mg(OH)_2 \xrightarrow{\text{high-temperature}} MgO + H_2O$$

The experiments prove that a conversion rate of magnesium metal to the magnesium oxide can reach 99.5% by using the preparation device 100 for the magnesium oxide fiber in accordance with the embodiment.

Further, the embodiment provides a preparation method for magnesium oxide fiber, which can use the preparation device 100 for the magnesium oxide fiber above, and includes the following steps:
- releasing magnesium metal fiber by the fiber releasing device 110;
- guiding the released magnesium metal fiber to pass through the electrochemical reaction device 120 for a galvanic cell reaction, wherein the magnesium metal fiber is used as an anode 122 and forms magnesium hydroxide fiber in the galvanic cell reaction;
- converting the magnesium hydroxide fiber into magnesium oxide fiber after the magnesium hydroxide fiber being heated by the heating device 130; and
- receiving the magnesium oxide fiber by the fiber receiving device 140.

Several examples are used for illustration of the principles and implementation methods of the present disclosure. The description of the embodiments is merely used to help appreciation of the method and its core concepts of the present disclosure. Meanwhile, those skilled in the art can make various modifications in terms of specific embodiments and applications in accordance with the teachings of the present disclosure. In conclusion, the content of the description shall not be construed as a limitation to the present disclosure.

What is claimed is:

1. A preparation device for magnesium oxide fiber, comprising:
   a fiber releasing device (110) for releasing magnesium metal fiber;
   an electrochemical reaction device (120) for oxidizing the magnesium metal fiber released by the fiber releasing device (110) into magnesium hydroxide fiber, comprising a solution storage part (121), a negative electrode (122) and a positive electrode (123), wherein neutral electrolyte is stored in the solution storage part (121) to soak the magnesium metal fiber released by the fiber releasing device (110); a first end of the negative electrode (122) is configured for being electrically connected to the magnesium metal fiber, a first end of the positive electrode (123) is configured for being electrically connected to the neutral electrolyte, and a second end of the negative electrode (122) and a second end of the positive electrode (123) are configured for outputting electric energy;
   a heating device (130) for heating the magnesium hydroxide fiber prepared by the electrochemical reaction device (120) to obtain magnesium oxide fiber; and
   a fiber receiving device (140) for receiving the magnesium oxide fiber obtained after the heating of the heating device (130).

2. The preparation device for magnesium oxide fiber according to claim 1, wherein the solution storage part (121) is a water absorption part.

3. The preparation device for magnesium oxide fiber according to claim 2, wherein the electrochemical reaction device (120) further comprises a solution adding device (124) for adding the neutral electrolyte into the water absorption part.

4. The preparation device for magnesium oxide fiber according to claim 3, wherein the solution adding device (124) is an electrolyte bath for accommodating the neutral electrolyte, and the water absorption part is configured for being partially immersed into the neutral electrolyte in the electrolyte bath.

5. The preparation device for magnesium oxide fiber according to claim 4, wherein the electrochemical reaction device (120) further comprises a first roller assembly and a second roller assembly, and the first roller assembly and the second roller assembly are respectively located at two sides of the magnesium metal fiber; the first roller assembly and the second roller assembly each comprise a roller (125) and a roller driving device (126); the roller driving device (126) is connected to the roller (125) to drive the roller (125) to rotate around an axis of the roller (125); the water absorption part is annular and encloses the roller (125), thus the water absorption part can keep in contact with the magnesium metal fiber when the roller (125) rotates; a portion of the roller (125) in contact with the water absorption part is provided with a catalyst layer, and the catalyst layer is configured for catalyzing the process of oxidizing the magnesium metal fiber into the magnesium hydroxide fiber; the electrolyte bath is mounted at an end of the roller (125) away from the roller driving device (126); the positive electrode (123) is mounted on the roller driving device (126), the first end of the positive electrode (123) is slidably electrically connected to the roller (125) to be electrically connected to the neutral electrolyte through the roller (125) and the catalyst layer.

6. The preparation device for magnesium oxide fiber according to claim 5, wherein the water absorption part on the first roller assembly and the water absorption part on the second roller assembly clamp the magnesium metal fiber from the two sides respectively.

7. The preparation device for magnesium oxide fiber according to claim 6, further comprising a first position adjusting device (150), wherein the first position adjusting device (150) is simultaneously connected to the roller driving device (126) of the first roller assembly and the roller driving device (126) of the second roller assembly, in order to enable clamping or loosening the magnesium metal fiber by the water absorption part on the first roller assembly and the water absorption part on the second roller assembly.

8. The preparation device for magnesium oxide fiber according to claim 7, wherein the first position adjusting device (150) comprises a first support (151), a first linear motor and a second linear motor; the roller driving device (126) of the first roller assembly is mounted on the first linear motor, and the roller driving device (126) of the second roller assembly is mounted on the second linear motor; and the first linear motor and the second linear motor are both mounted on the first support (151) slidably along a straight line.

9. The preparation device for magnesium oxide fiber according to claim 8, wherein the first support (151) is further provided with a first strip-shaped groove (1511), a retractable first wire is arranged in the first strip-shaped groove (1511), the second end of the positive electrode (123) is slidably mounted in the first strip-shaped groove (1511), and the second end of the positive electrode (123) is electrically connected to the first wire.

10. The preparation device for magnesium oxide fiber according to claim 1, wherein the fiber releasing device (110) comprises an unwinding spool driving device (111) and an unwinding spool (112), the unwinding spool (112) is configured for winding the magnesium metal fiber, and the unwinding spool driving device (111) is connected to the unwinding spool (112) to drive the unwinding spool (112) to rotate around an axis of the unwinding spool (112); the negative electrode (122) is mounted on the unwinding spool driving device (111), and the first end of the negative electrode (122) is slidably electrically connected to the unwinding spool (112) to be electrically connected to the magnesium metal fiber through the unwinding spool (112).

11. The preparation device for magnesium oxide fiber according to claim 10, wherein the fiber receiving device (140) further comprises a winding spool driving device (141) and a winding spool (142), the winding spool (142) is configured for winding the magnesium oxide fiber, and the winding spool driving device (141) is connected to the winding spool (142) to drive the winding spool (142) to rotate around an axis of the winding spool (142).

12. The preparation device for magnesium oxide fiber according to claim 11, further comprising a second position adjusting device (160), wherein the second position adjusting device (160) is simultaneously connected to the unwinding spool driving device (111) and the winding spool driving device (141) to adjust a spacing distance between the unwinding spool (112) and the winding spool (142).

13. The preparation device for magnesium oxide fiber according to claim 12, wherein the second position adjusting device (160) comprises a second support, a third linear motor and a fourth linear motor; the unwinding spool driving device (111) is mounted on the third linear motor, and the winding spool driving device (141) is mounted on the fourth linear motor; and the third linear motor and the fourth linear motor are both mounted on the second support slidably along a straight line.

14. The preparation device for magnesium oxide fiber according to claim 13, wherein the second support is provided with a second strip-shaped groove, a retractable second wire is arranged in the second strip-shaped groove, the second end of the negative electrode (122) is slidably mounted in the second strip-shaped groove, and the second end of the negative electrode (122) is electrically connected to the second wire.

15. A preparation method for magnesium oxide fiber, comprising the following steps:
  releasing magnesium metal fiber by a fiber releasing device (110);
  guiding the released magnesium metal fiber to pass through an electrochemical reaction device (120) to conduct a galvanic cell reaction, wherein the magnesium metal fiber is configured as an anode (122) and forms magnesium hydroxide fiber in the galvanic cell reaction;
  converting the magnesium hydroxide fiber into magnesium oxide fiber after the magnesium hydroxide fiber being heated by a heating device (130); and
  receiving the magnesium oxide fiber by a fiber receiving device (140).

* * * * *